Aug. 22, 1950     S. VICTOR     2,519,518
NOW BY JUDICIAL CHANGE OF NAME
SAM WOMEN SAM
PICTURE FRAME AND PICTURE SHEET
Filed March 25, 1948

INVENTOR.
Samuel Victor
Now By Judicial Change of Name,
Sam Women Sam.

Patented Aug. 22, 1950

2,519,518

UNITED STATES PATENT OFFICE 2,519,518

PICTURE FRAME AND PICTURE SHEET

Samuel Victor, Chicago, Ill.; now by judicial
change of name Sam Women Sam

Application March 25, 1948, Serial No. 17,021

4 Claims. (Cl. 40—152)

This invention relates to earrings. An object of the invention is to provide an earring in which interchangeable picture sheets may be inserted with the utmost ease and from which they may be removed with the utmost ease. Another object is to provide such a picture frame and picture which holds transparent, interchangeable picture sheets face forward so as to take full advantage of their transparency. Other objects become apparent as the description proceeds.

Figure 1:
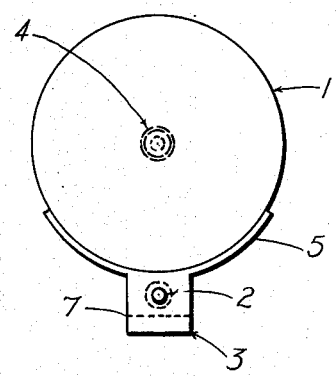

In Figure 1 is shown a front view of an assembly of an earring with a picture sheet.

Figure 2:
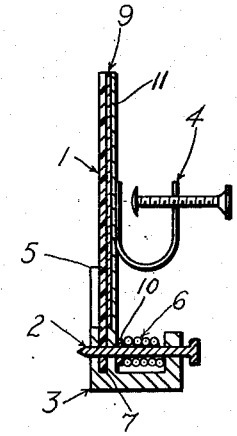

In Figure 2 is shown an axial sectional view of the earring assembly shown in Figure 1.

Figure 3:
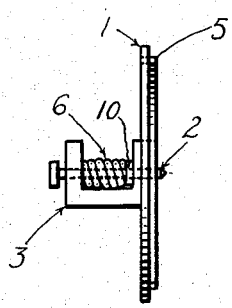

In Figure 3 is shown a side view of a similar earring which is adapted to hold the picture sheet face forward.

Figure 4:
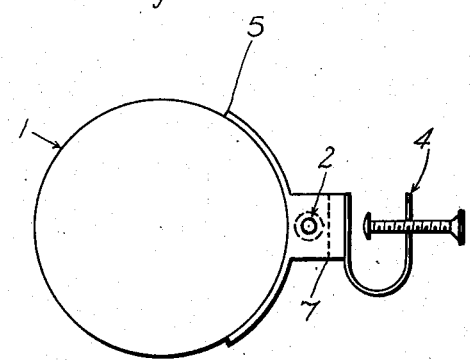

In Figure 4 is shown a front view of the earring shown in Figure 3.

Figure 5:
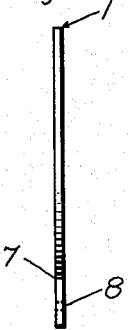

In Figure 5 is shown an edge view of a picture sheet 1.

Figure 6:
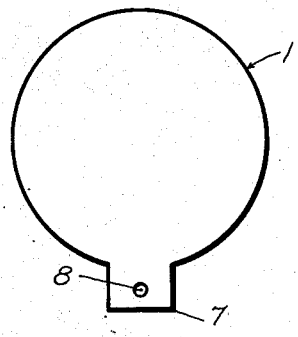

In Figure 6 is shown a front view of a picture sheet 1.

In Figure 1 is shown a conventional ear screw clamp 4. Picture sheet 1 is circular and transparent. It may have a three dimensional picture. Picture sheet 1 may be made of the material such as movie films are made. It has an appending ear 7 with an eye 8. The picture sheet holding device 3 has a socket in which the ear 7 is inserted and it also has a frame 5 on which a segment of the edge of picture sheet 1 rests. A pin 2 is inserted through the eye 8 in the ear 7 of the picture sheet 1. The pin 2 has a flange stop 10 fixed to it. The compression spring 6 presses against the flange stop of the pin 2.

In order to insert a picture sheet 1 into the holder 3, the head of the pin 2 is pulled so that its flange stop compresses the spring 6 and so that the pin 2 is out of the socket of holder 3, in which the ear 7 of picture sheet 1 is held. The eye 8 in the ear 7 is in line with the holes in holder 3 through which the pin 4 is inserted.

The holder 3 has an upward extension 11 serving as a back for the picture sheet 1. The front of holder 3 is faced with a phosphorescent coating 9 on its upward extension.

I claim:

1. A frame adapted for convenient insertion radially and removal radially of a picture sheet having an ear extension with an eyelet, projecting radially from its periphery; said frame having a socket extending radially from said frame and adapted to hold transversely and snugly such an ear extension; said socket being provided with transverse coaxial eyelets in its front and back; said socket being also provided with a spring tensioned pin coaxial with and normally located in latter eyelets, adapted to pin said ear extension with an eyelet in said socket through latter eyelet and eyelets of said socket.

2. In combination, a picture sheet having an ear extension projecting radially from its periphery, said ear extension having an eyelet; and a frame adapted for convenient insertion radially and removal radially of said picture sheet; said frame having a socket extending radially from said frame and adapted to hold transversely and snugly said ear extension; said socket being provided with transverse eyelets in its front and back; said socket being also provided with a spring tensioned pin coaxial with and normally located in latter eyelets, adapted to pin said ear with an eyelet in said socket through the latter eyelet and eyelets of said socket.

3. A frame adapted for convenient insertion radially and removal radially of a picture sheet having an ear extension with an eyelet, projecting radially from its periphery; said frame having a socket extending radially from said frame and adapted to hold transversely and snugly such an ear extension; said socket being provided with transverse coaxial eyelets in its front and back; said socket being also provided with a spring tensioned pin coaxial with, and normally located in, latter eyelets, adapted to pin said ear extension with an eyelet in said socket through latter eyelet and eyelets of said socket; said pin extending externally in relation to said socket and having a convenient handle formed at its externally extending end; said pin being provided with a spring and fixed flange stop substantially as described.

4. In combination, a picture sheet having an ear extension projecting radially from its periphery, said ear extension having an eyelet; and a frame adapted for convenient insertion radially and removal radially of said picture sheet; said frame having a socket extending radially from said frame and adapted to hold transversely and snugly said ear extension; said socket being provided with transverse eyelets in its front and back; said socket being also provided with a spring tensioned pin coaxial with and normally located in latter eyelets, adapted to pin said ear with an eyelet in said socket through latter eyelet and eyelets of said socket; said pin extending externally in relation to said socket and having a convenient handle formed at its externally extending end; said pin being provided with a spring and fixed flange stop substantially as described.

SAM WOMEN SAM,
(Formerly Samuel Victor).

REFERENCES CITED

The following references are of record in the file of this patent:

UNITED STATES PATENTS

| Number | Name | Date |
|---|---|---|
| 1,220,418 | Hawkes | May 27, 1917 |
| 1,692,999 | Siegel | Nov. 27, 1928 |
| 1,776,618 | Chadwick | Sept. 23, 1930 |
| 1,949,180 | Rettich | Feb. 27, 1934 |
| 2,104,256 | Hambeck | Jan. 4, 1938 |
| 2,125,780 | Goggin | Aug. 2, 1938 |
| 2,154,959 | Roose | Apr. 18, 1939 |